US011083201B2

(12) United States Patent
Santra et al.

(10) Patent No.: US 11,083,201 B2
(45) Date of Patent: Aug. 10, 2021

(54) AGRICHEMICAL COMPOSITIONS AND METHODS OF MAKING AND USING SAME

(71) Applicant: UNIVERSITY OF CENTRAL FLORIDA RESEARCH FOUNDATION, INC., Orlando, FL (US)

(72) Inventors: Swadeshmukul Santra, Oviedo, FL (US); Smruti Das, Orlando, FL (US); Parthiban Rajasekaran, Orlando, FL (US); Tyler Maxwell, Orlando, FL (US)

(73) Assignee: UNIVERSITY OF CENTRAL FLORIDA RESEARCH FOUNDATION, INC., Orlando, FL (US)

( * ) Notice: Subject to any disclaimer, the term of this patent is extended or adjusted under 35 U.S.C. 154(b) by 0 days.

(21) Appl. No.: 15/517,644

(22) PCT Filed: Oct. 13, 2015

(86) PCT No.: PCT/US2015/055265
§ 371 (c)(1),
(2) Date: Apr. 7, 2017

(87) PCT Pub. No.: WO2016/061059
PCT Pub. Date: Apr. 21, 2016

(65) Prior Publication Data
US 2017/0303543 A1 Oct. 26, 2017

Related U.S. Application Data

(60) Provisional application No. 62/062,997, filed on Oct. 13, 2014.

(51) Int. Cl.
| | | |
|---|---|---|
| *A01N 59/00* | (2006.01) | |
| *A01N 37/16* | (2006.01) | |
| *A01N 59/16* | (2006.01) | |
| *A01N 47/28* | (2006.01) | |
| *A01N 37/10* | (2006.01) | |
| *C05C 9/00* | (2006.01) | |
| *C05D 9/02* | (2006.01) | |

(52) U.S. Cl.
CPC ............. *A01N 59/00* (2013.01); *A01N 37/10* (2013.01); *A01N 37/16* (2013.01); *A01N 47/28* (2013.01); *A01N 59/16* (2013.01); *C05C 9/00* (2013.01); *C05D 9/02* (2013.01)

(58) Field of Classification Search
CPC ........ A01N 59/00; A01N 37/10; A01N 37/16; A01N 59/16; A01N 47/28; A01N 37/40; A01N 43/16; C05C 9/00; C05D 9/02
See application file for complete search history.

(56) References Cited

U.S. PATENT DOCUMENTS

| | | | | |
|---|---|---|---|---|
| 4,337,147 A | * | 6/1982 | Frame .................. | B01J 31/0239 208/206 |
| 4,477,438 A | * | 10/1984 | Willcockson .......... | A01N 59/00 252/389.52 |
| 6,106,854 A | * | 8/2000 | Belfer .................... | A01N 59/00 424/405 |
| 6,288,076 B1 | * | 9/2001 | Kostyniak .............. | A01N 25/08 514/299 |
| 6,972,273 B2 | * | 12/2005 | Sedun .................... | A01N 37/32 504/113 |
| 2009/0324820 A1 | * | 12/2009 | Chartier ................. | C09D 5/086 427/239 |
| 2013/0259957 A1 | * | 10/2013 | Dagher .................. | A01N 37/16 424/722 |

FOREIGN PATENT DOCUMENTS

| | | | |
|---|---|---|---|
| CN | 1193460 | | 9/1998 |
| CN | 1201594 A | | 12/1998 |
| CN | 1915972 | | 2/2007 |
| CN | 101993279 | | 3/2011 |
| CN | 101993279 B | * | 2/2013 |
| EP | 2476314 | | 7/2012 |
| JP | 2009029164 | | 2/2009 |
| WO | 2008021441 | | 2/2008 |
| WO | 2008058490 | | 5/2008 |

OTHER PUBLICATIONS

Wang et al., CN101993279, 2013, English Translation, Patent Translate powered by EPO and Google, 19 pages. (Year: 2013).*
Liu, Shih-Hsien, et al. "Antimicrobial Zn-Based "TSOL" for Citrus Greening Management: Insights from Spectroscopy and Molecular Simulation"; Journal of Agriculture and Food Chemistry, 67, copyright 2019 American Chemical Society; ACS Publications, pp. 6970-6977.
Mendis, Hajeewaka, et al. "A novel Zn Chelate (TSOL) that moves systemically in citrus plants inhibits growth and biofilm formation of bacterial pathogens", PLOS One, https://doi.org/10.1371/journal.pone.0218900; Jun. 24, 2019, pp. 1-21.
Rawal, Takat, et al., "Interaction of Zinc Oxide Nanoparticles with Water: Implications for Catalytic Activity", ACS Applied Nano Materials; published by American Chemical Society; Jun. 12, 2019; 26 pages.
Rawal, Takat, et al., Supplemental Information "Interaction of Zinc Oxide Nanoparticles with Water: Implications for Catalytic Activity", pp. S-1 through S-15. 2019.

(Continued)

*Primary Examiner* — Sue X Liu
*Assistant Examiner* — Andriae M Holt
(74) *Attorney, Agent, or Firm* — George McGuire

(57) ABSTRACT

A composition comprising a chelate-based ternary complex is useful for: (1) at least in-part disabling existing populations of microorganisms; and (2) at least in-part inhibiting growth of new microorganism populations. The chelate-based ternary complex comprises a hydrogen peroxide component, a plant compatible growth promoter component and a divalent zinc ion component. The plant compatible growth promoter component may comprise a urea component or a gluconate component or a salicylate component.

18 Claims, 26 Drawing Sheets

(56) References Cited

OTHER PUBLICATIONS

European Patent Office Communication issued in corresponding European Application No. 15788258.0 dated Oct. 2, 2019; 4 pages.
Search Report and Opinion for Office Action Brazil Application No. 11 2017 007659 4; published in official gazette Aug. 19, 2019; 3 pages.
Maxwell, Tyler, et al., TSOL—a Zn chelate based bactericide/fungicide formulation; Santra Research Group University of Central Florida, Sep. 23, 2019; 38 pages.
Maxwell, Tyler, et al., Control of Citrus Canker in Greenhouse and Field with a Zinc, Urea and Peroxide Ternary Solution, Journal of Agriculture and Food Chemistry, published by American Chemical Society, Publication Date (Web) Oct. 9, 2019; 35 pages.
International Search Report and Written Opinion Form PCT/ISA/220, International Application No. PCT/US2015/055265, pp. 1-13, International Filing Date Oct. 13, 2015, dated Dec. 18, 2015.

* cited by examiner

Table summarizing Zinc content in Untreated Tomato Plants Vs Treated with 100 ppm TSOL™ Tomato Plants (*Solanum lycopersicum*)

| mg of Zinc/ Gram Dried Weight of Plant Sample | | | |
|---|---|---|---|
| | Untreated | Treated | Difference |
| Root | 3.8 | 4.1 | 0.3 |
| Leaf | 2.6 | 9.6 | 7 |
| Stem | 2.1 | 3 | 0.9 |
| Root + Stem + Leaf | 8.5 | 16.7 | 8.2 |
| Whole Plant | 0.7 | 2.9 | 2.2 |
| Xylem | 1.6 | 5.1 | 3.5 |
| Phloem | 8.7 | 10.5 | 1.8 |

FIG. 2A

Table summarizing Zinc content in Untreated Tomato Plants Vs Treated with 300 ppm TSOL™ Tomato Plants (*Solanum lycopersicum*)

| mg of Zinc/ Gram Dried Weight of Plant Sample | | | |
|---|---|---|---|
| | Untreated | Treated | Difference |
| Root | 3.8 | 4 | 0.2 |
| Leaf | 2.6 | 3.1 | 0.5 |
| Stem | 2.1 | 1.6 | -0.5 |
| Root + Stem + Leaf | 8.5 | 8.7 | 0.2 |
| Whole Plant | 0.7 | 4 | 3.3 |
| Xylem | 1.6 | 1.9 | 0.3 |
| Phloem | 8.7 | 11.4 | 2.7 |

FIG. 2B

Table summarizing Zinc content in Untreated Tomato Plants Vs Treated with 500 ppm TSOL™ Tomato Plants (*Solanum lycopersicum*)

| mg of Zinc/ Gram Dried Weight of Plant Sample | | | |
|---|---|---|---|
| | Untreated | Treated | Difference |
| Root | 3.8 | 7.2 | 3.4 |
| Leaf | 2.6 | 5.5 | 2.9 |
| Stem | 2.1 | 7.1 | 5 |
| Root + Stem + Leaf | 8.5 | 19.8 | 11.3 |
| Whole Plant | 0.7 | 7.3 | 6.6 |
| Xylem | 1.6 | 3.6 | 2 |
| Phloem | 8.7 | 9.4 | 0.7 |

FIG. 2C

Table summarizing Zinc content in Untreated Tomato Plants Vs Treated with 800 ppm TSOL™ Tomato Plants (*Solanum lycopersicum*)

| mg of Zinc/ Gram Dried Weight of Plant Sample | | | |
|---|---|---|---|
| | Untreated | Treated | Difference |
| Root | 3.8 | 5.4 | 1.6 |
| Leaf | 2.6 | 3.6 | 1 |
| Stem | 2.1 | 3.6 | 1.5 |
| Root + Stem + Leaf | 8.5 | 12.6 | 4.1 |
| Whole Plant | 0.7 | 4.1 | 3.4 |
| Xylem | 1.6 | 3.2 | 1.6 |
| Phloem | 8.7 | 10.3 | 1.6 |

FIG. 2D

Phytotoxicity Test with Tomato plants at 100PPM TSOL™ Treatment

Phytotoxicity Test with Tomato plants at 800ppm TSOL™ Treatment
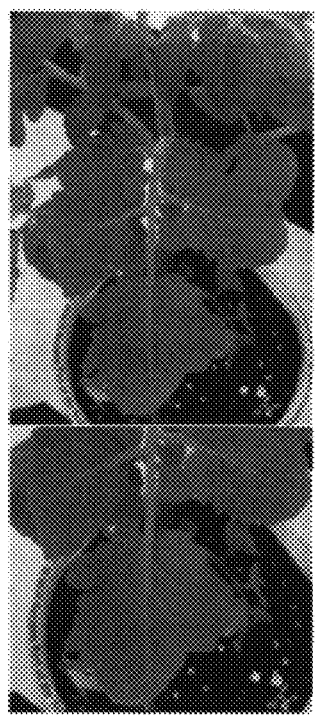  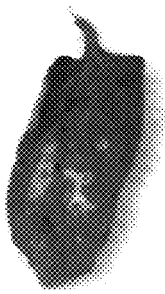
Untreated               TSOL™ Treated
                        (800ppm)
FIG. 3D

**Phytotoxicity study of different concentrations of TSOL ™ on Tomato (*Solanum lycopersicum*) plants**

| Sl. No. | Tested Material | Metallic Zinc Concentration (µg/mL) | Phytotoxicity Rating 24 h |
|---|---|---|---|
| 1 | Untreated | NA | -- |
| 2 | TSOL ™ | 100 | -- |
| 3 | TSOL ™ | 300 | ++ |
| 4 | TSOL ™ | 500 | +++ |
| 5 | TSOL ™ | 800 | +++ |

--    Non Phytotoxic
++   Moderately Phytotoxic
+++  Severe Phytotoxic

FIG. 4

Observed characteristic FTIR peaks

| Sl. No | TSOL™ (cm-1) | Zinc Nitrate (cm-1) | Urea (cm-1) | Hydrogen Peroxide (cm-1) |
|---|---|---|---|---|
| 1 | 3362 | 3359 | 3435 | 3249 |
| 2 | 1630 | 1624 | 3329 | 1624 |
| 3 | 1583 | 1351 | 1583 | |
| 4 | 1305 | 819 | 1459 | |
| 5 | 1150 | | 787 | |
| 6 | 1038 | | | |

**Phytotoxicity study of different concentrations of TSOL ™ on Meyer Lemon (*Citrus × meyeri*) plants**

| Sl. No. | Tested Material | Metallic Zinc Concentration (µg/mL) | Phytotoxicity Rating | | |
|---|---|---|---|---|---|
| | | | 24 h | 48 h | 72 h |
| 1 | Untreated | NA | − | − | − |
| 2 | TSOL ™ | 300 | − | − | − |
| 3 | TSOL ™ | 500 | − | − | − |
| 4 | TSOL ™ | 700 | − | − | + |
| 5 | TSOL ™ | 900 | − | + | ++ |

T-SOL composition: Zn-Nitrate, Urea, Hydrogen Peroxide (1:1:1 molar ratio)

− Non Phytotoxic
+ Slight Phytotoxic
++ Moderately Phytotoxic

FIG. 10

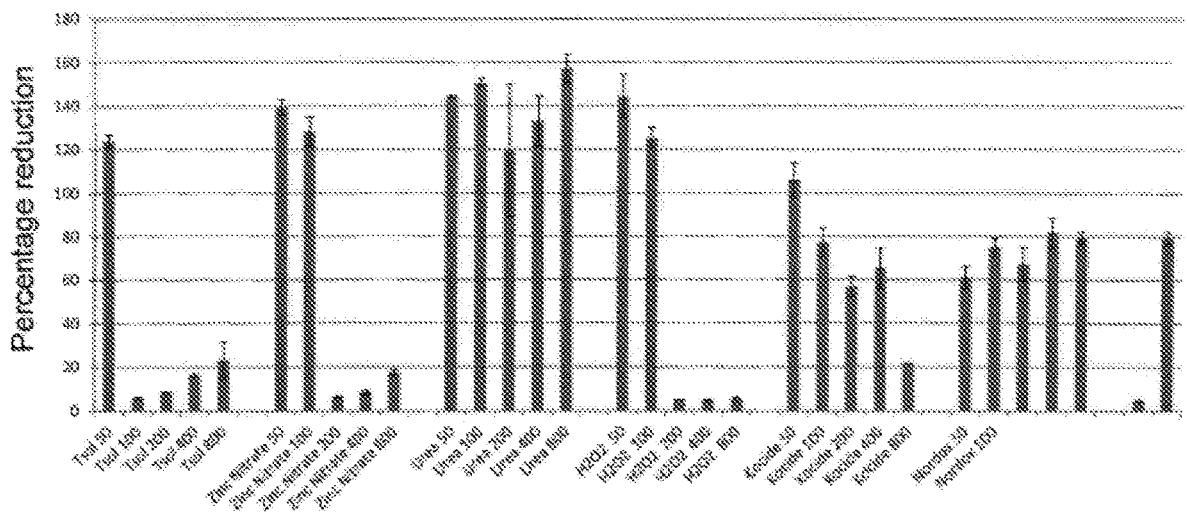

- Dye reduction test – percentage reduction corresponds to viable bacteria – blue dye reduced to pink
- 5X10⁵ CFU/well of *E. coli*
- Numbers on the sample label indicates metallic zinc concentration in PPM (μg/mL) wherever applicable
- For Urea and Hydrogen peroxide – numbers indicate corresponding concentration used in the same volume of T-SOL
- 10 ul/well of Alamar blue added and incubated for 60 min
- Absorbance measured at 570 and 600 nm and percentage calculated using manufacturer supplied formula
- In case of Nordox, the material itself contributes to absorbance – see picture for blue color to indicate bacterial killing.

FIG. 11A

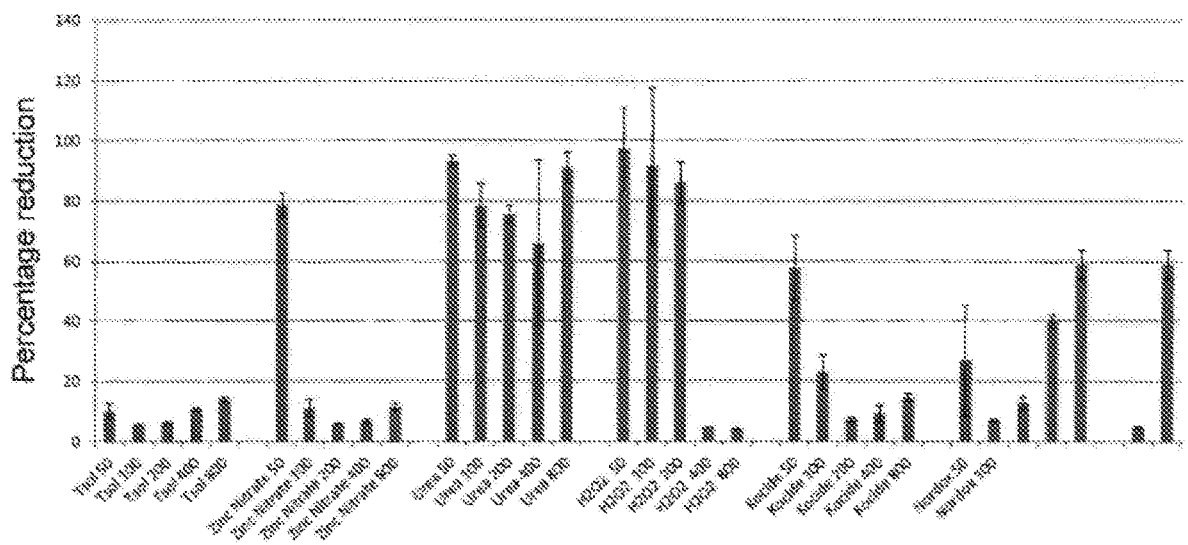
* Dye reduction test – percentage reduction corresponds to viable bacteria – blue dye reduced to pink
* 5X10⁵ CFU/well of *X. alfalfae*
* Numbers on the sample label indicates metallic zinc concentration in PPM (μg/mL) wherever applicable
* For Ur

AGRICHEMICAL COMPOSITIONS AND METHODS OF MAKING AND USING SAME

CROSS-REFERENCE TO RELATED APPLICATION

This application is related to, and derives priority from and claims benefit of International Patent Application No. PCT/US2015/055265 filed 13 Oct. 2015, which claimed priority to U.S. Provisional Patent Application Ser. No. 62/062,997, filed 13 Oct. 2014 and titled Compositions, Methods of Making a Composition, and Methods of Use, the contents of which is incorporated herein fully by reference.

STATEMENT OF GOVERNMENT INTEREST

Not Applicable.

BACKGROUND

Field

Embodiments relate generally to agrichemical compositions. More particularly embodiments relate to agrichemical compositions with enhanced performance.

Description

Agricultural production plays an increasingly important and substantial role in the social welfare and economic productivity of many countries and geographic regions. However, agricultural production is often limited due to the presence and propagation of diseases and pests, as well as the presence of generally poor soil conditions and the occurrence of unpredictable meteorological anomalies.

Since agricultural productivity and global economic sustainability are closely intertwined, and since both are often critical for world security, desirable are methods and materials for securing global agricultural productivity which in turn would be expected to contribute to secure global economic prosperity.

SUMMARY

Embodiments provide a composition suitable for agricultural applications, a method for producing the composition suitable for the agricultural applications and a method for using the composition suitable for the agricultural applications.

A particular composition in accordance with the embodiments comprises a chelate-based ternary complex composition that includes a hydrogen peroxide component in conjunction with a urea component and a divalent zinc cation component. The hydrogen peroxide component and the urea component chemically couple together (as is generally understood within the context of hydrogen bonding) and form a chelating component (i.e., a carbamate peroxide component) with respect to the divalent zinc cation component, to in an aggregate form a carbamate peroxide chelated divalent zinc ion component as the chelate-based ternary composition.

Another particular composition in accordance with the embodiments is also a chelate-based ternary composition that includes a hydrogen peroxide component, but now in conjunction with a gluconate component (i.e., commonly but not necessarily exclusively a sodium gluconate component rather than the urea component) and the divalent zinc cation component. In this particular composition the hydrogen peroxide component and the gluconate component chemically couple together to form a chelating component with respect to the divalent zinc cation component.

Yet another composition in accordance with the embodiments is also a ternary composition that includes a divalent zinc cation component and a hydrogen peroxide component, but now in conjunction with a salicylate component such as but not limited to a sodium salicylate component.

Within the context of the embodiments: (1) the hydrogen peroxide component provides antimicrobial characteristics; (2) the urea component (or the gluconate or alternatively the salicylate component) provides hydrogen peroxide stabilization characteristics and plant compatible growth promoter characteristics (which may under certain circumstances may also be characterized as soil nutrient characteristics and which may also include foliar plant nutrient characteristics); and (3) the divalent zinc ion component provides at least one of foliar nutrient characteristics and soil nutrient characteristics.

A particular composition in accordance with the embodiments includes a chelate-based ternary complex.

A particular method for producing the particular composition in accordance with the embodiments includes mixing together within an aqueous solution three components to provide a chelate-based ternary complex. The method also includes adjusting as needed the pH of the solution to provide a pH within a specific range.

A particular method for using the particular composition in accordance with the embodiments includes treating a surface of a structure with a composition. Within this particular method the composition comprises a chelate-based ternary complex that at least either: (1) disables at least a portion of a microorganism population formed upon the substrate; and (2) inhibits at least in-part the growth of a microorganism population on the structure.

BRIEF DESCRIPTION OF THE DRAWINGS

The objects, features and advantages of the embodiments are understood within the context of the Detailed Description of the Non-Limiting Embodiments, as set forth below. The Detailed Description of the Non-Limiting Embodiments is understood within the context of the accompanying drawings, that form a material part of this disclosure, wherein:

FIG. 2A, FIG. 2B, FIG. 2C and FIG. 2D show a series of data Tables for zinc accumulation within various parts (whole plant, leaves, root, stem, xylem and phloem) of a tomato plant as a function of TSOL dosage treatment in accordance with the embodiments.

FIG. 3A, FIG. 3B, FIG. 3C and FIG. 3D show a series of images of tomato plants treated with TSOL at various dose concentrations in accordance with the embodiments.

FIG. 4 shows a tabular summary of tomato plant subjective data observations from FIG. 3A to FIG. 3D in accordance with the embodiments.

FIG. 10 shows a graphical compilation of data derived from the images of FIG. 9A, FIG. 9B, FIG. 9C, FIG. 9D and FIG. 9E FIG. 11A, FIG. 11B, FIG. 11C and FIG. 11D show a series of images illustrating Alamar Blue assay for antimicrobial activity of TSOL in accordance with the embodiments.

DETAILED DESCRIPTION OF THE NON-LIMITING EMBODIMENTS

Basic Considerations

Figure 1A:
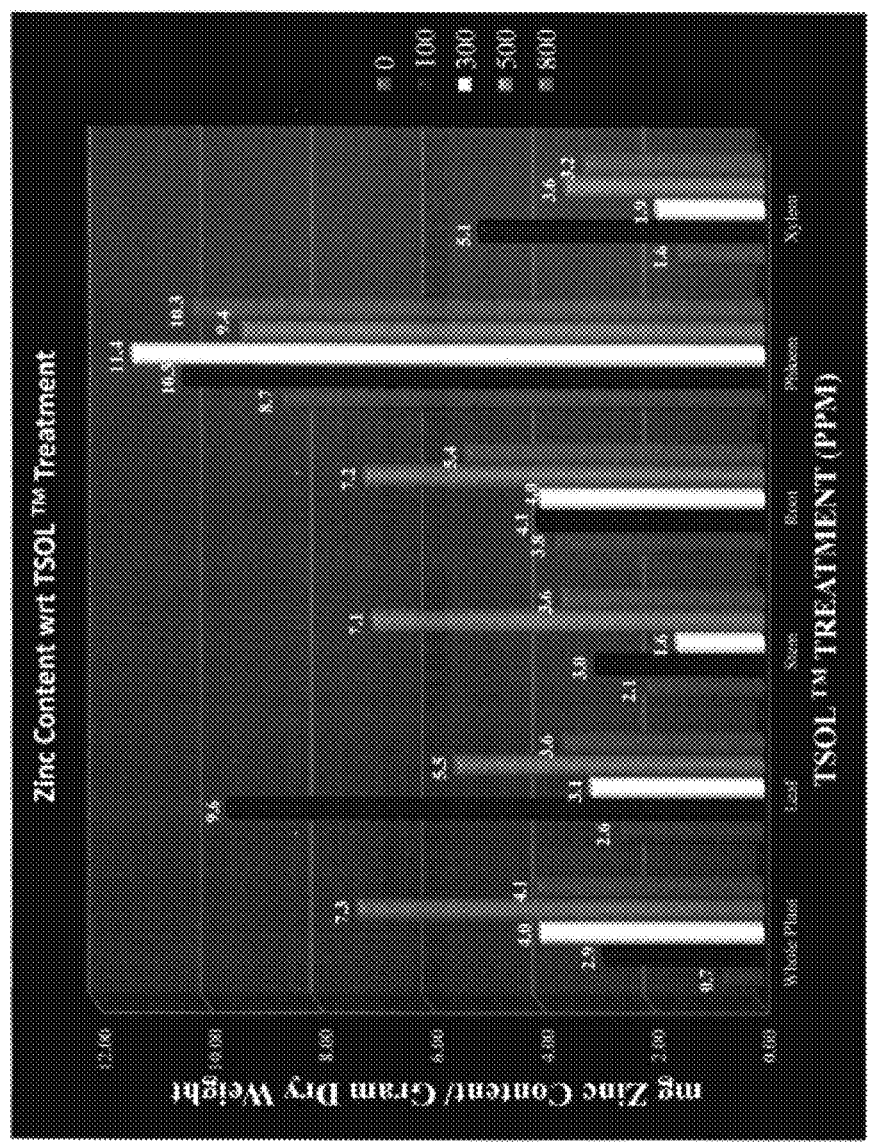
FIG. 1A and FIG. 1B show graphs of zinc content as a function of tomato plant component and total TSOL dosage treatment for various parts (whole plant, leaves, root, stem, xylem and phloem) of a tomato plant in accordance with the embodiments, with and without basal zinc concentration.

The embodiments are predicated upon a three component composition (i.e., a chelate-based ternary complex composition) in a first instance in the form of a carbamate peroxide chelated divalent zinc cation composition that is useful in an agricultural application. The carbamate peroxide chelated divalent zinc cation composition derives from a hydrogen peroxide component, a urea component and a divalent zinc salt component. The carbamate peroxide chelated divalent zinc cation composition acts simultaneously as an antimicrobial material (i.e., due to the presence of the hydrogen peroxide component), a plant compatible growth promoter (i.e., a soil nutrient material, due to presence of the urea component) and a systemic nutrient material (i.e., due to presence of the divalent zinc ion component).

The embodiments also consider as a chelate-based ternary complex a second three-component composition that comprises a gluconate component (i.e., such as but not limited to a sodium gluconate component) and a third three-component composition that comprises a salicylate component (i.e., such as but not limited to a sodium salicylate component) in place of the urea component.

In accordance with the objects of the present disclosure, as embodied and broadly described herein, embodiments of the present disclosure, in one aspect, relate to compositions that comprise a chelate-based ternary complex, methods of making the compositions, methods of using the compositions, and related considerations. In an embodiment, a composition can be used as an antimicrobial agent to disable (i.e., kill) existing populations of microorganisms and/or to inhibit the formation of new populations of microorganisms, on a surface of an agricultural object such as but not limited to a tree, a plant or the like while also providing nutrients to the tree or the plant. Embodiments of the chelate-based ternary complex composition can be used in a liquid formulation with the capability of boosting plant growth and minimizing threat from microbial infection.

An embodiment of the present disclosure provides a chelate-based ternary complex, that includes hydrogen peroxide (microbial agent), urea/gluconate/salicylate (hydrogen peroxide stabilizer and plant compatible growth promoter component) and divalent zinc ion (a plant micronutrient that is capable of forming complex with urea and hydrogen peroxide), and can be referred to as "TSOL." Each of these components is compatible with plant systems. In an embodiment, urea stabilizes hydrogen peroxide through the formation of a urea-hydrogen peroxide adduct (also known as carbamide peroxide, also known as hydrogen bonding). In an embodiment, introduction of divalent zinc ion results in the formation of a ternary complex (hydrogen peroxide-urea-zinc) as it has dual affinity for both hydrogen peroxide component and the urea component.

Stoichiometry of this complex can depend on the relative molar ratio of hydrogen peroxide:urea:zinc and be about 5 to 90 weight percent of each of hydrogen peroxide, urea and zinc ion in the chelate-based ternary complex composition, about 20 to 60 weight percent of each of hydrogen peroxide, urea and zinc ion in the chelate-based ternary complex composition or about 33 weight percent of each of hydrogen peroxide, urea and zinc ion in the chelate-based ternary complex composition.

In an embodiment, the concentration of hydrogen peroxide can be about 1 micromolar (1 μM) to 1 molar (1M) in the chelate-based ternary complex. In an embodiment, the concentration of the urea or gluconate or salicylate can be about 1 micromolar (1 μM) to 1 molar (1 M) in the chelate-based ternary complex. In an embodiment, the concentration of the divalent zinc ion can be about 1 micromolar (1 μM) to 1 molar (1M) in the chelate-based ternary complex.

In an embodiment, the divalent zinc ion can be provided by a water soluble form of a zinc compound such as zinc sulfate, zinc chloride, zinc nitrate, zinc acetate and the like.

Embodiments of the chelate-based ternary complex can be designed to boost plant health by promoting growth (as it contains nitrogen fertilizer and micronutrient zinc) and preventing damage due to infection caused by plant pathogens. Thus, the chelate-based ternary complex composition in accordance with the embodiments serves at least a dual role.

Carbamide peroxide is approved for use in human populations as a tooth whitening (oxidizing) agent. Peroxide antibacterial activity of carbamate peroxide (a free radical producing agent) has been well studied and used commercially as general purpose disinfectant. Divalent ionic zinc is an essential plant micronutrient. The chelate-based ternary complex composition is not only safe for plant protection but also eco-friendly and is a green-technology.

Figure 12:
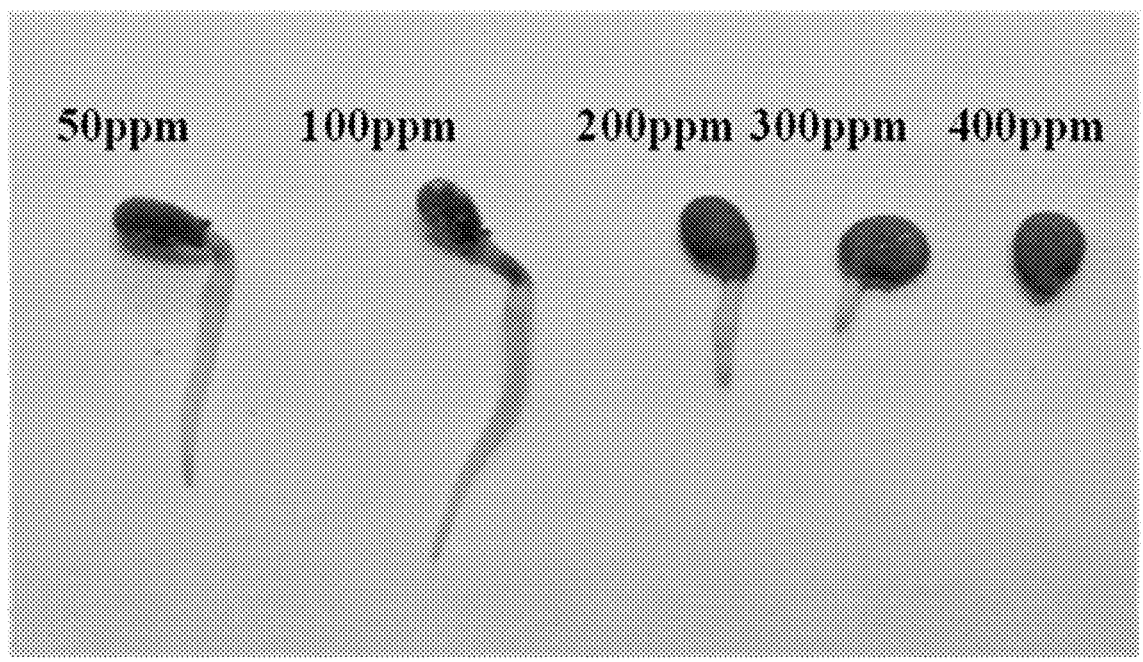
FIG. 12 shows tomato seed germination assistance provided by various concentrations of TSOL treatment in accordance with the embodiments.

Embodiments of the present disclosure provide for improved anti-microbial efficacy against *Escherichia coli* and *Xanthomonas* alfalfae (as compared to independent hydrogen peroxide component, urea component and divalent zinc ion component controls) due to the synergistic effect from zinc and hydrogen peroxide. In addition, seed germination may be improved using chelate-based ternary complex treatment (e.g., observed for 50 ppm chelate-based ternary complex when studied on tomato seeds as illustrated in FIG. 12).

In addition, embodiments of the present disclosure provide for a composition that can be used for multiple purposes. Embodiments of the present disclosure are advantageous in that they can substantially prevent and/or treat or substantially treat a disease or condition in a plant, and act at least as an antibacterial and/or antifungal.

In an embodiment, the composition may have an antimicrobial characteristic (e.g., disables at least 70%, at least 80%, at least 90%, at least 95%, or at least 99% of the microorganisms (e.g., bacteria) on the surface and/or reduces the amount of microorganisms that form or grow on the surface by at least 70%, at least 80%, at least 90%, at least 95%, or at least 99%, as compared with a similar surface without the composition disposed on the surface). Additional details are described in the Examples.

In an embodiment, the composition can be disposed on a surface of a structure. In an embodiment, the structure can include plants such as trees, shrubs, grass, agricultural crops, and the like, and includes leaves and fruit. In an embodiment, the composition provides uniform plant surface coverage, substantial uniform plant surface coverage, or substantially covers the plant. In an embodiment, the composition can be used to treat a plant having a disease or to prevent the plant from obtaining a disease.

In an embodiment, after the composition is disposed on the surface, the structure may have an antimicrobial characteristic that is capable of disabling a substantial portion of the microorganisms (e.g., bacteria such as E. coli, B. subtilis and S. aureus) on the surface of the structure and/or inhibits or substantially inhibits the growth of the microorganisms on the surface of the structure. The phrase "disabling a substantial portion" includes disabling at least about 70%, at least about 80%, at least about 90%, at least about 95%, or at least about 99% of the microorganism (e.g., bacteria) on the surface that the composition is disposed on, relative to structure that does not have the composition disposed thereon. The phrase "substantially inhibits the growth" includes reducing the growth of the microorganism (e.g., bacteria) by at least about 70%, at least about 80%, at least about 90%, at least about 95%, or at least about 99% of the microorganisms on the surface that the composition is disposed on, relative to a structure that does not have the composition disposed thereon.

As mentioned above, embodiments of the present disclosure are effective for the treatment of diseases affecting plants such as citrus plants and trees. In an embodiment, the composition can function as an antibacterial and/or antifungal, specifically, treating, substantially treating, preventing or substantially preventing, plant diseases such as citrus greening (HLB) and citrus canker diseases.

Embodiments of the present disclosure can be applied on the time frames consistent with the treating or preventing diseases and the like, and these time frames can include from the first day of application to about a week, about a month, about two months, about three months, about four months, about five months, about six months, about seven month, or about eight months.

EXAMPLE COMPOSITIONS

The following concentrated chelate-based ternary complex composition (referred to as TSOL formulations (TSOL chelate and TSOL colloid)) were prepared from its constituent ingredients, hydrogen peroxide, urea and zinc ion source. Molar ratio of hydrogen peroxide:urea:divalent zinc was 1:1:1.

A. Synthesis of TSOL Chelate: A Step-by-Step Procedure
1. Take 50 ml of hydrogen peroxide (30%) (EMD, HX0640-5) in a 500 ml beaker
2. Add 29.1 grams of urea (Fisher, U 15-500)
3. Magnetically stir the solution until urea is dissolved completely
4. Add 144 grams of zinc nitrate hexahydrate (Fisher, Z45-500) in portions under continuous stirring conditions
5. Add water dropwise to dissolve the remaining zinc nitrate powder.
6. The final volume of the TSOL product is approximately 170 ml
7. Store the TSOL concentrate under refrigeration in a hydrogen peroxide compatible storage container until further use B. Synthesis of TSOL Colloid: A Step-by-Step Procedure
1. Take 50 ml of hydrogen peroxide (30%) (EMD, HX0640-5) in a 500 ml beaker
2. Add 29.1 grams of urea (Fisher, U15-500)
3. Magnetically stir the solution until urea is dissolved completely
4. Add 144 grams of zinc nitrate hexahydrate (Fisher, Z45-500) in portions under continuous stirring conditions
5. Add water dropwise to dissolve the remaining zinc nitrate powder.
6. Add sodium hydroxide (concentrated solution) dropwise to adjust the formulation pH in the range between 7.0 and 8.0.
7. Store the TSOL colloid under refrigeration in a hydrogen peroxide compatible storage container until further use.

For either of the foregoing two TSOL compositions, the metallic divalent zinc cation was calculated to be around 186,000 ppm.

Notes:
(i) A series of TSOL formulations can be prepared by adjusting relative ratio of hydrogen peroxide:urea:zinc nitrate.
(ii) Divalent zinc ion source can be any water soluble form of zinc compound (such as zinc sulfate, zinc chloride, zinc nitrate and zinc acetate).
(iii) A typical concentration range of hydrogen peroxide can vary from 1 micromolar (1 μM) to 1 molar (1M)
(iv) A typical concentration range of urea or gluconate or salicylate can vary from 1 micromolar (1 μM) to 1 molar (IM)
(v) A typical concentration range of zinc can vary from 1 micromolar (1 μM) to 1 molar (1 M)
(vi) A higher urea concentration range or gluconate or salicylate concentration range with respect to hydrogen peroxide concentration range may provide a more stable chelate-based ternary complex.

Variations and Abbreviations:
TSOL (hydrogen peroxide, urea, zinc; (low pH 2.0 to 6.0)
TSOL 7.5 (hydrogen peroxide, urea, zinc, sodium hydroxide); (adjust pH to 6.5 to 8.0)
TSOL G (hydrogen peroxide, sodium gluconate, zinc); (low pH 2.0 to 6.0)
TSOL G 7.5 (hydrogen peroxide, sodium gluconate, zinc, sodium hydroxide); (adjust pH to 6.5 to 8.0)
TSOL S (hydrogen peroxide, sodium salicylate, zinc); (low pH 2.0 to 6.0)
TSOL S 7.5 (hydrogen peroxide, sodium salicylate, zinc, sodium hydroxide); (adjust pH to 6.5 to 8.0)

EXPERIMENTAL RESULTS

Preparation of Seeds

Tomato seeds were purchased from Home Depot, Orlando, Fla. and stored in a dry opaque packet at room temperature. Prior to use, the seeds were soaked in DI water for 30 min to soften the seed coat. Thereafter surface sterilization was performed by washing the seeds with separate solutions of 70% ethanol and 1% sodium hypochlorite for 1 minute. Seeds were then washed five times with DI water to ensure the removal of additional sterilizing solutions remaining on the surface.

Plant Germination Tests

Seeds were soaked under different concentrations of TSOL (50, 100, 200, 300 and 400 ppm) for 24 hr. Seed germination was then tested on moist filter paper (Whatman™ filter paper size 41; GE Healthcare Life Sciences). In each Petri dish (85 mm diameter), 20 seeds were randomly placed on the filter paper, then 5 mL of TSOL solution was added (i.e. treated seed samples). Experiments were conducted in triplicates and the controls were maintained by similarly treating seeds with 5 mL of DI water. Seeds were germinated for five days under dark in a controlled environmental condition (25° ° C. and 50% relative humidity, RH). Germination was considered successful when the coleoptiles were longer than 2 mm. Three replicates were carried out for each treatment. Germination rate is the average number of seeds that germinate over the five-day time period. An image of germinated seeds and TSOL assistance to that end is provided in FIG. 12.

For additional background one may review:
1. (Das, S., et al., *Effect of N-acetyl cysteine coated CdS: Mn/ZnS quantum dots on seed germination and seedling growth of snow pea (Pisum sativum L.): imaging and spectroscopic studies*. Environmental Science-Nano, 2015. 2(2): p. 203-212; and
2. Das, S., et al., *Translocation of N-acetyl Cysteine Capped Fluorescent Quantum Dots in Plant Tissue: Confocal Imaging Studies*. Materials Research Society, 2015. 1754).

Phytotoxicity Test and Plant Uptake Studies with Tomato Plants

Tomato plants (*Solanum lycopersicum* L.) were treated through foliar spray application with different concentrations of TSOL (100, 300, 500 and 800 ppm). After 24 hours of treatment plants were sampled, dried (for 48 hours) and grinded to powder. Known mass of dried powder samples were digested with 20 ml of aqua regia solution for 2 hours. Digested samples were then filtered and used for atomic absorption spectroscopy (AAS) studies for estimate amount of zinc uptake by different parts of plant (whole plant, leaves, root, stem, xylem and phloem). Phytotoxicity data was collected after 24 hour of treatment.

FIG. 1A shows a graph of zinc content as a function of TSOL treatment concentration for various components of a tomato plant in accordance with the embodiments.

As can be seen in FIG. 1A, the tomato plant xylem cells absorb less zinc as a consequence of the TSOL treatment than corresponding phloem cells. Further, absorbance of zinc within either the leaf, the stem or the roots is approximately equal.

Figure 1B:
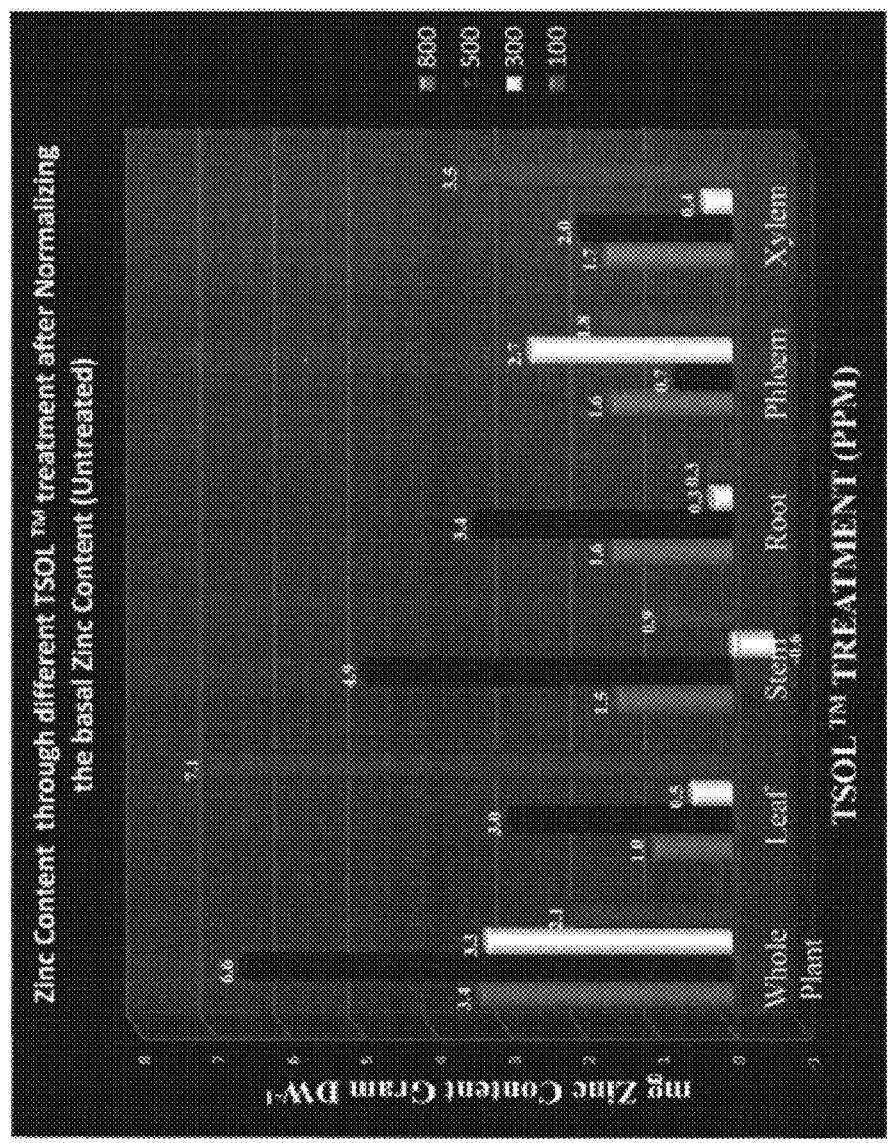
Figure 3A:
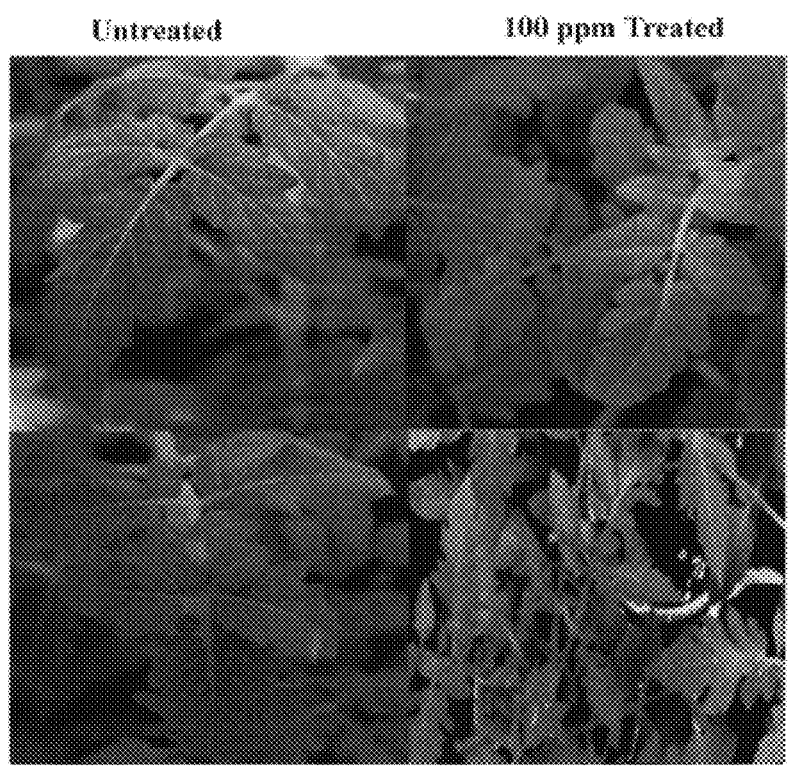
Figure 3B:
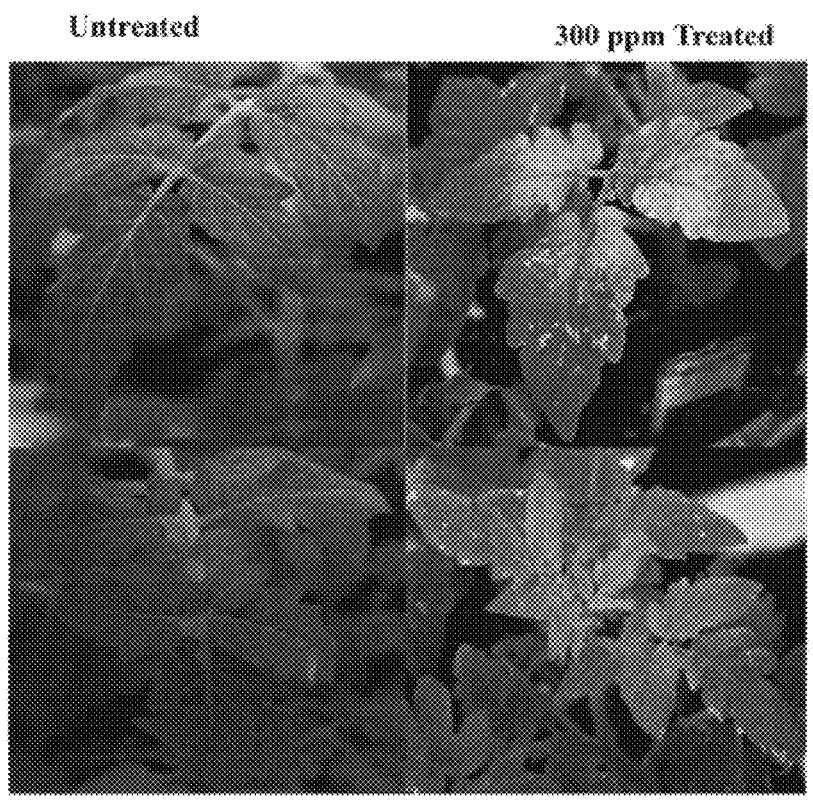
Figure 3C:
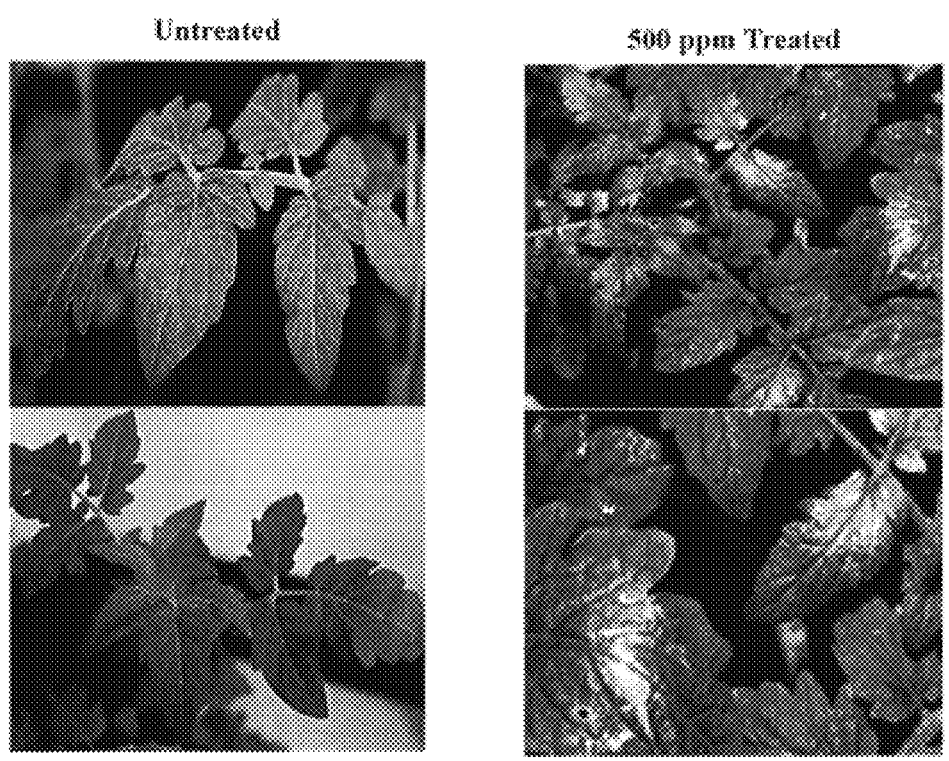

FIG. 1B shows a graph similar to the graph of FIG. 1A, but wherein the data is first normalized to a basal zinc content for a TSOL untreated tomato plant. No particular trend is illustrated by the graph of FIG. 1B.

FIG. 2A, FIG. 2B, FIG. 2C and FIG. 2D show a series of data Table presentations for zinc accumulation within various parts of a tomato plant as a function of TSOL dose application in accordance with the embodiments.

Apparently most noticeable within the data of FIG. 2A, FIG. 2B, FIG. 2C and FIG. 2D is the observation that treatment of a tomato plant with TSOL at 500 ppm appears to have a uniquely enhanced uptake in comparison with any of the other TSOL concentrations.

FIG. 3A, FIG. 3B, FIG. 3C and FIG. 3D show a series of images of tomato plants treated with TSOL at various dose concentrations in accordance with the embodiments.

FIG. 4 shows a summary Table of tomato plant subjective data observations from FIG. 3A to FIG. 3D in accordance with the embodiments. The data of FIG. 4 shows the TSOL composition to be phytotoxic to tomato plants at all dose concentrations except 100 ppm.

Figure 5:
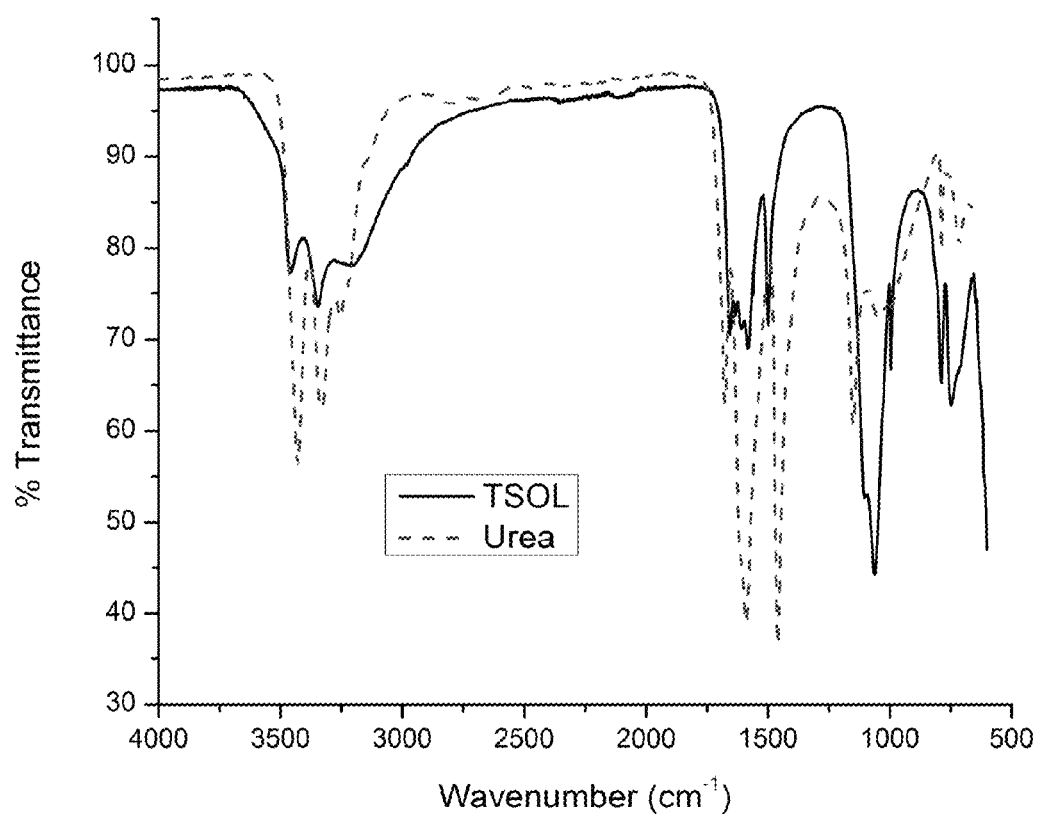
FIG. 5 shows an aggregate FTIR spectra of TSOL and urea.

FIG. 5 shows the FTIR spectra of TSOL and urea.

FIG. 6A, FIG. 6B, FIG. 6C and FIG. 6D show an analysis of FTIR spectra of TSOL in accordance with the embodiments.

Figure 6A:
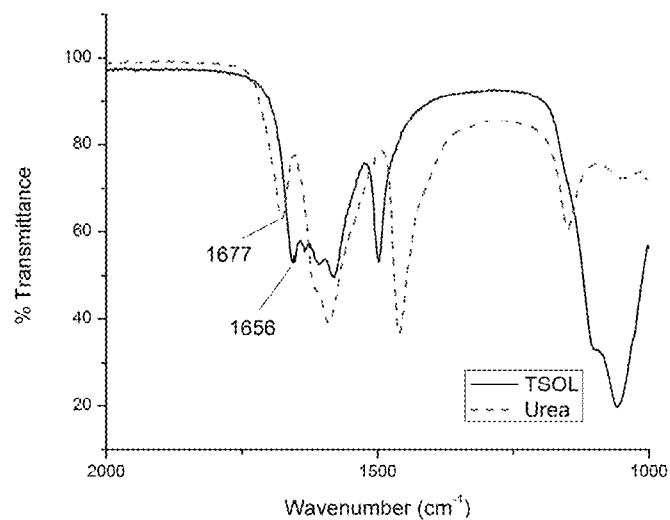
FIG. 6A, FIG. 6B, FIG. 6C and FIG. 6D show an analysis of FTIR spectra of TSOL in accordance with the embodiments.

In particular the data of FIG. 6A shows a shift in a urea carbonyl stretch from 1656 $cm^{-1}$ to 1677 $cm^{-1}$ which is attributed to coordination of the divalent zinc ion through the urea oxygen.

Figure 6B:
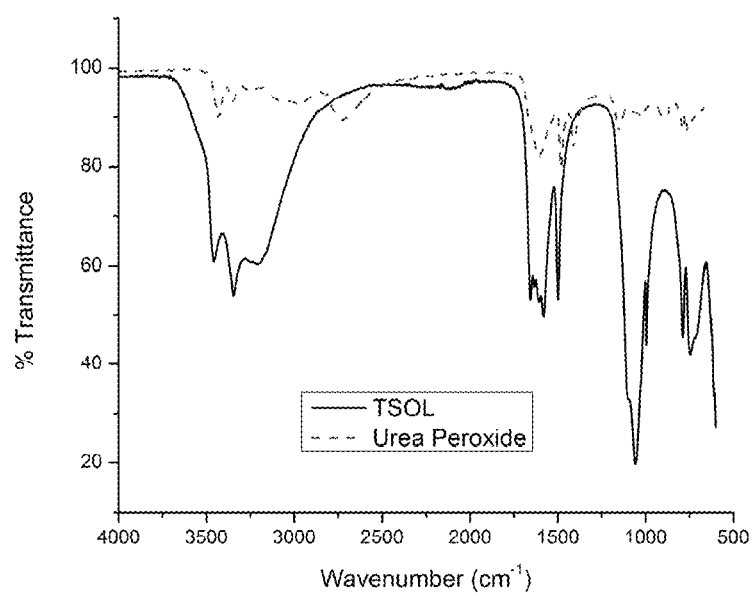
Figure 6C:
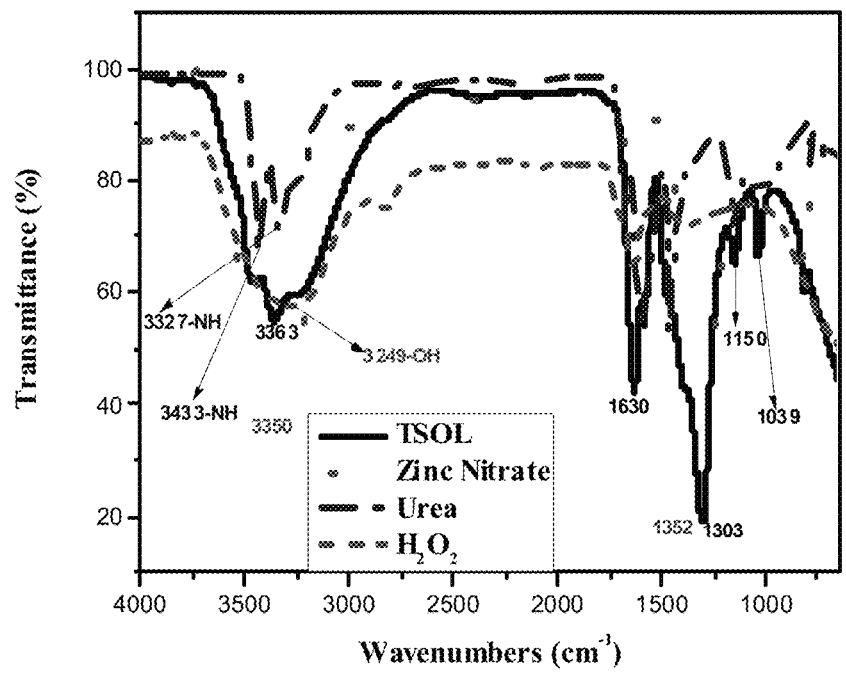
Figure 6D:
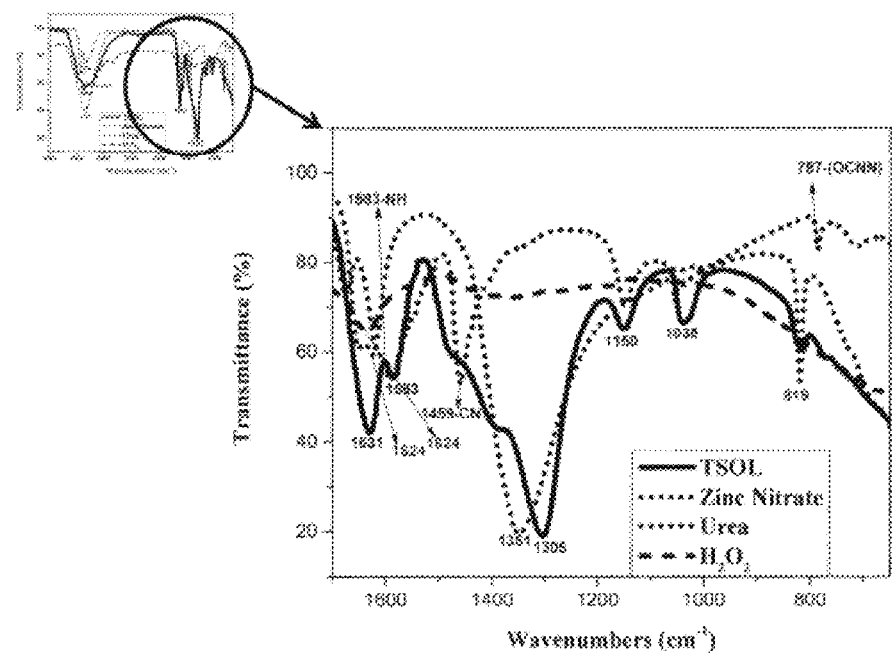

FIG. 6B shows infrared spectra of TSOL and commercially purchased urea peroxide. This figure illustrates the retention of hydrogen peroxide by the TSOL embodiments after the commercial hydrogen peroxide is added to the formulation.

Figures 7, 8:
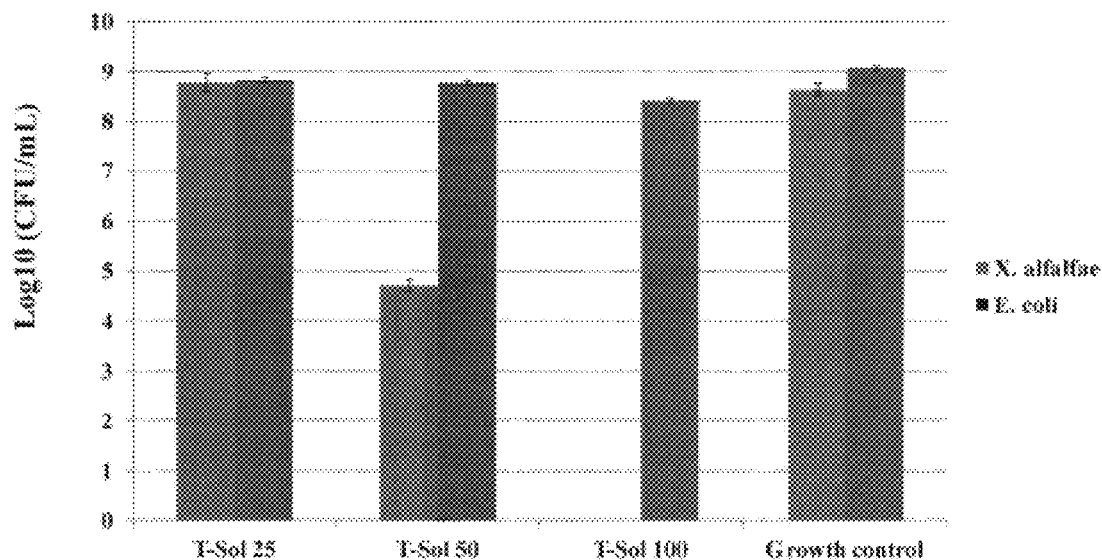
FIG. 7 shows a tabular summary of the data of FIG. 6A, FIG. 6B, FIG. 6C and FIG. 6D.
FIG. 8 shows a graphical summary of antimicrobial characteristics of TSOL in accordance with the embodiments.
Figure 9A:
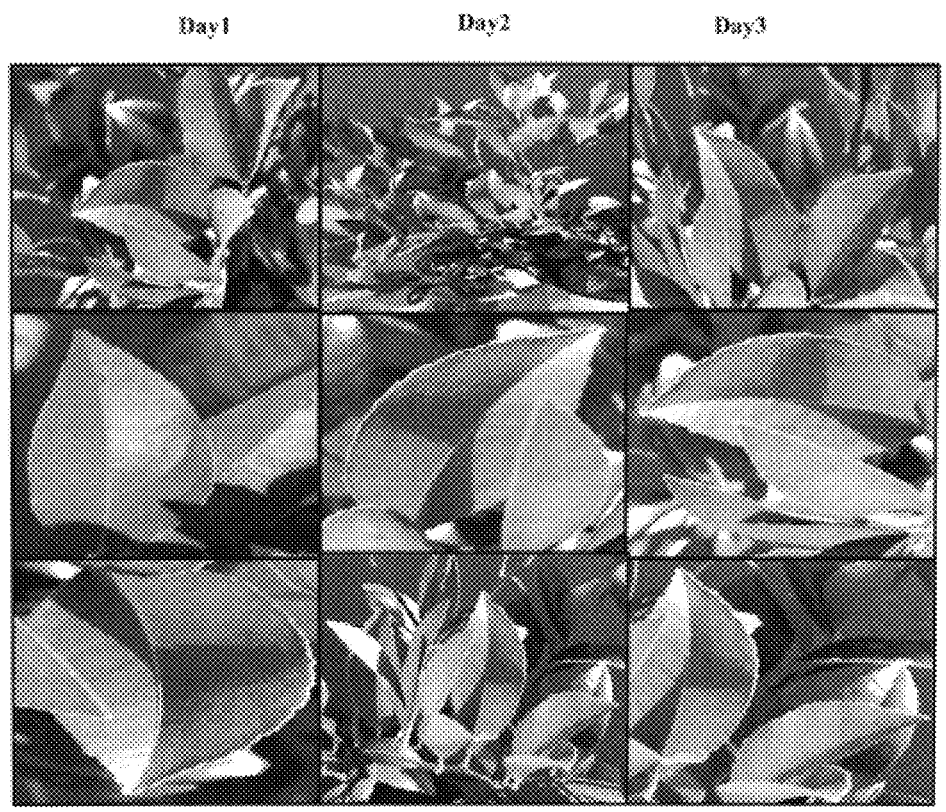
FIG. 9A, FIG. 9B, FIG. 9C, FIG. 9D and FIG. 9E show a series of images illustrating and quantifying phytotoxicity of TSOL with respect to Meyer Lemon plant in accordance with the embodiments.
Figure 9B:
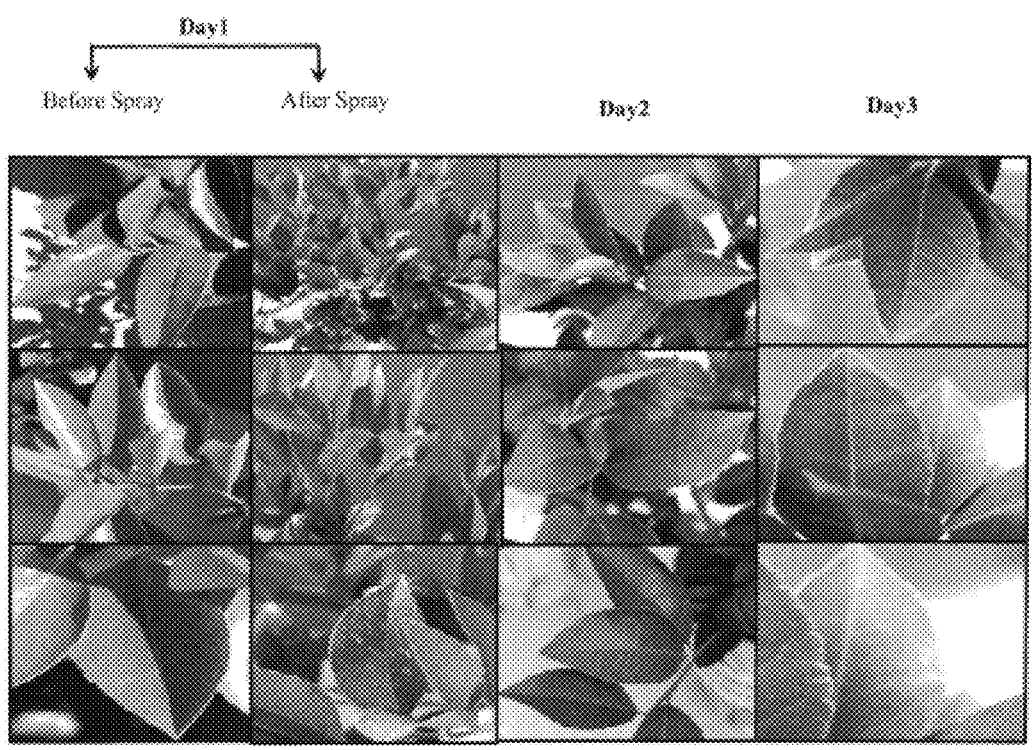
Figure 9C:
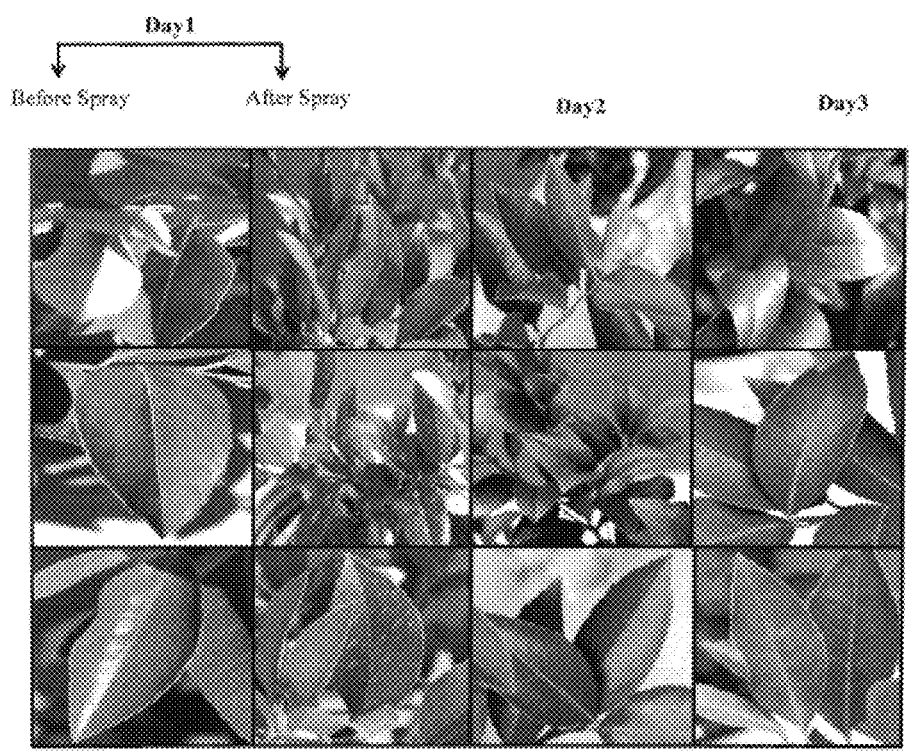
Figure 9D:
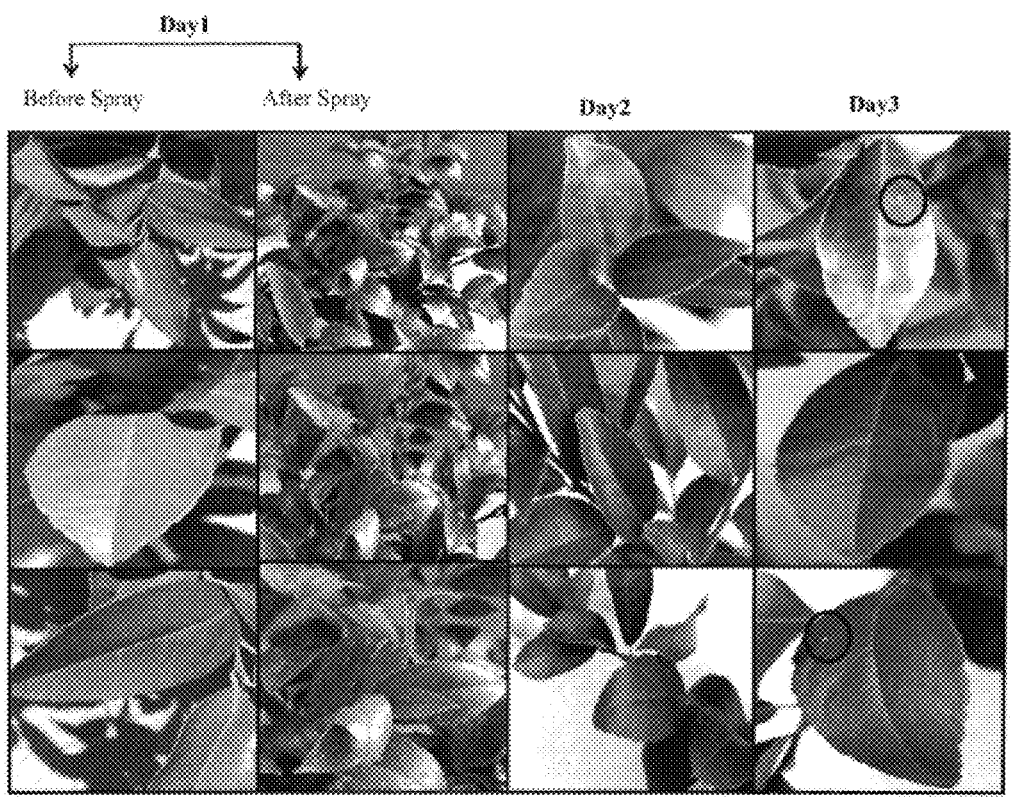
Figure 9E:
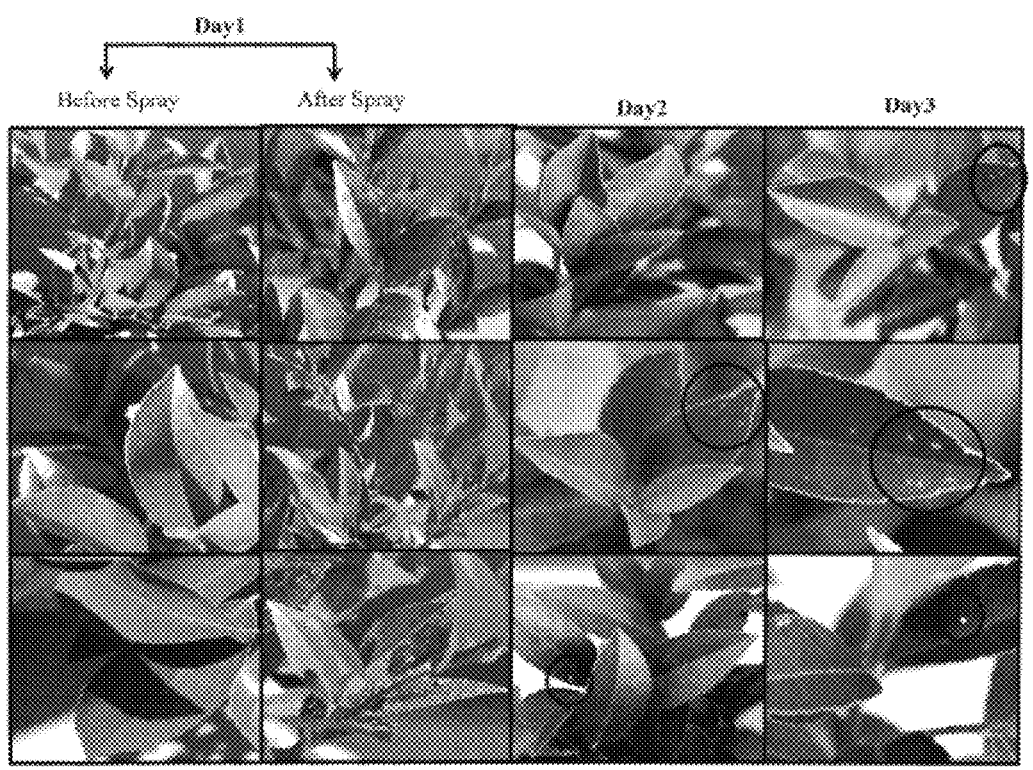
Figure 11B:
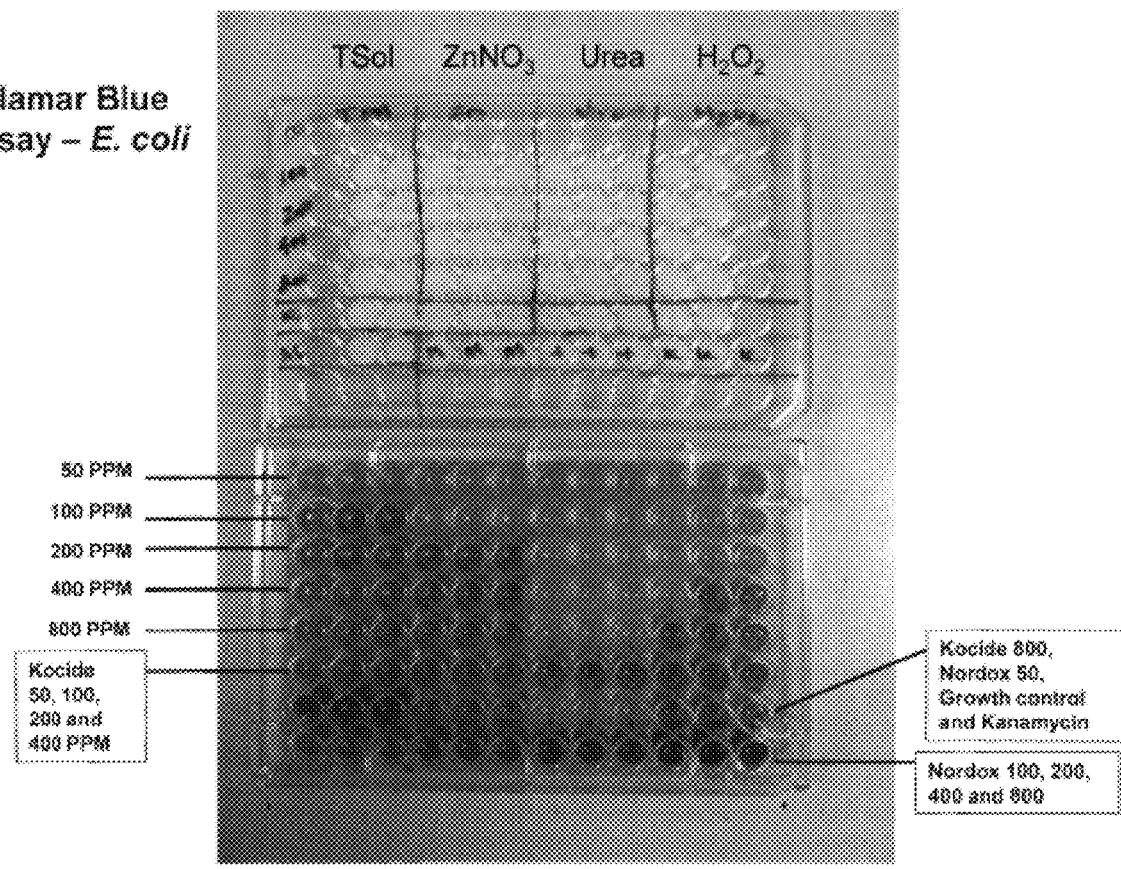
Figure 11D:
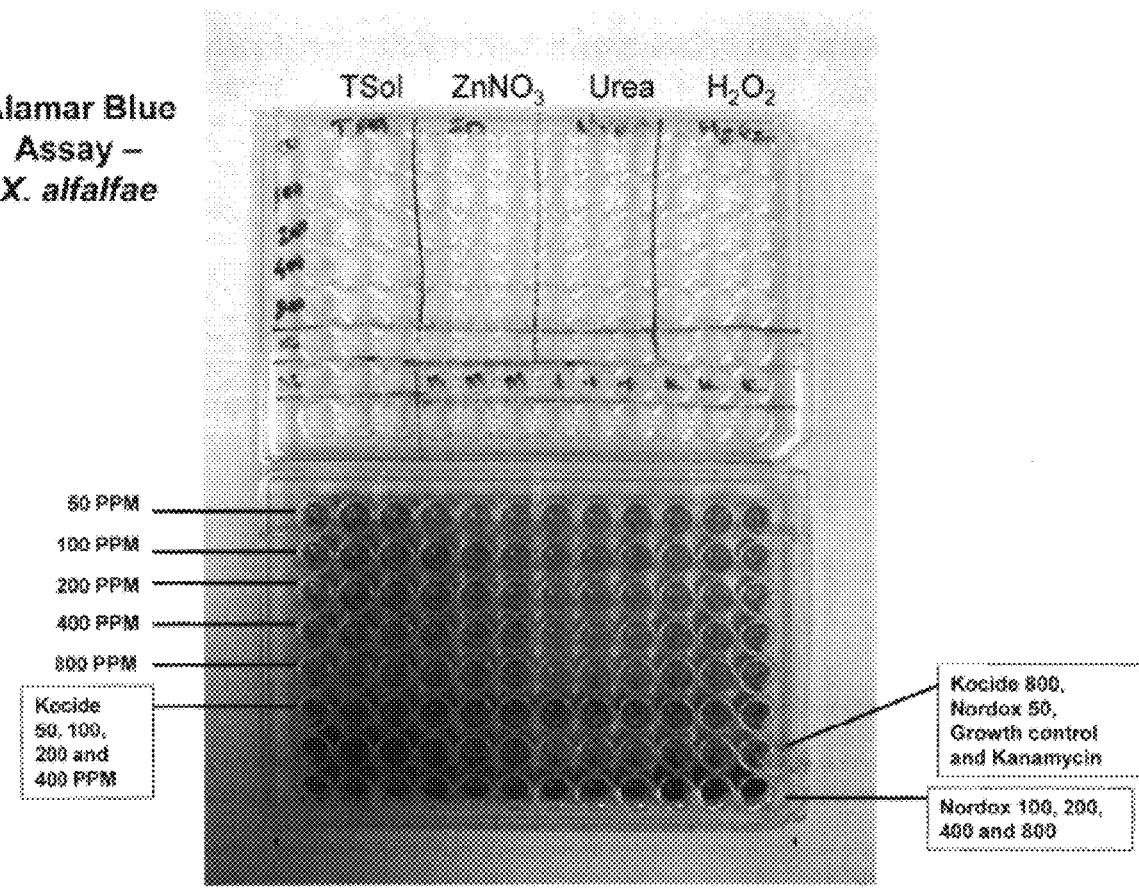

FIG. 7 shows a data Table enumerating distinguishable infrared resonances in accordance with the embodiments.

FIG. 8 shows a graphical result of antimicrobial activity of TSOL 25 (metallic zinc 25 ppm), TSOL 50 (metallic zinc 50 ppm) and TSOL 100 (metallic zinc 100 ppm) in a controlled experiment with respect to *X. alfalfae* and *E. coli*. As illustrated by the graphical data TSOL is more effective at 50 ppm and 100 ppm against *X. alfalfae* in comparison with *E. coli*.

FIG. 9A, FIG. 9B, FIG. 9C, FIG. 9D and FIG. 9E show a series of images illustrating phytotoxicity of TSOL with respect to Meyer Lemon plant in accordance with the embodiments.

FIG. 10 shows a data Table including compiled data derived from the images of FIG. 9A, FIG. 9B, FIG. 9C, FIG. 9D and FIG. 9E.

FIG. 11A, FIG. 11B, FIG. 11C and FIG. 11D show a series of images illustrating Alamar Blue assay in accordance with the embodiments. As shown in the graph, TSOL is highly effective against *Xanthomonas alfalfae* at metallic zinc concentration as low as 50 PPM whereas the individual components of TSOL (hydrogen peroxide, urea and divalent zinc ion at relevant concentrations) separately did not elicit similar effect at those concentrations. This suggests the enhanced antimicrobial property of TSOL when used as a ternary formulation. TSOL also appeared to provide enhanced antimicrobial activity when compared to comparable commercial products such as Kocide™ and Nordox™.

It is to be understood that this disclosure is not limited to the foregoing particular embodiments described, as such may, of course, vary. It is also to be understood that the terminology used herein is for the purpose of describing particular embodiments only, and is not intended to be limiting, since the scope of the present disclosure will be limited only by the appended claims.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are above described.

As will be apparent to those of skill in the art upon reading this disclosure, each of the individual embodiments described and illustrated herein has discrete components and features that may be readily separated from or combined with the features of any of the other several embodiments without departing from the scope or spirit of the present disclosure. Any recited method can be carried out in the order of events recited or in any other order that is logically possible.

Embodiments of the present disclosure will employ, unless otherwise indicated, techniques of chemistry, polymer chemistry, biology, and the like, which are within the skill of the art. Such techniques are explained fully in the literature. The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is in atmospheres. Standard temperature and pressure are defined as 25° C. and 1 atmosphere.

It is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to measurement techniques and the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

All references, including publications, patent applications, and patents cited herein are hereby incorporated by reference in their entireties to the same extent as if each reference was individually and specifically indicated to be incorporated by reference and were set forth in its entirety herein. As noted above, the use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein (i.e., which are intended to have a relative uncertainty of 10% unless clearly otherwise indicated) are merely intended to serve as a shorthand method of referring individually to each separate value falling within the range, unless otherwise indicated herein, and each separate value is incorporated into the specification as if it was individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

APPENDIX

Definitions

The term "antimicrobial characteristic" refers to the ability to disable (i.e., kill) and/or inhibit the growth of microorganisms. A substance having an antimicrobial characteristic may be harmful to microorganisms (e.g., bacteria, fungi, protozoan's, algae, and the like). A substance having an antimicrobial characteristic can kill the microorganism and/or prevent or substantially prevent the growth or reproduction of the microorganism. Within the context of the specification and the claims, an "antimicrobial characteristic" is intended as broad terminology.

The term "antibacterial characteristic" refers to the ability to kill and/or inhibit the growth of bacteria. A substance having an antibacterial characteristic may be harmful to bacteria. A substance having an antibacterial characteristic can kill the bacteria and/or prevent or substantially prevent the replication or reproduction of the bacteria.

"Uniform plant surface coverage" refers to a uniform and complete (e.g., about 100%) wet surface due to spray application of embodiments of the present disclosure. In other words, spray application causes embodiments of the present disclosure to spread throughout the plant surface. In an embodiment, complexes of the present disclosure can provide uniform plant surface coverage.

"Substantial uniform plant surface coverage" refers to about 70%, about 80%, about 90%, or more uniform plant surface coverage. In an embodiment, complexes of the present disclosure can provide substantial uniform plant surface coverage.

"Substantially covering" refers to covering about 70%, about 80%, about 90%/o, or more, of the leaves and branches of a plant. In an embodiment, complexes of the present disclosure can substantially cover the plants.

"Plant" refers to trees, plants, shrubs, flowers, and the like as well as portions of the plant such as twigs, leaves, stems, branches, fruit, flowers, and the like. In a particular embodiment, the term plant includes a fruit tree such as a citrus tree (e.g., orange tree, lemon tree, lime tree, and the like).

As used herein, "treat," "treatment," "treating," and the like refer to acting upon a disease or condition with a composition of the present disclosure to affect the disease or condition by improving or altering it. In addition, "treatment" includes completely or partially preventing (e.g., about 70% or more, about 80% or more, about 90% or more, about 95% or more, or about 99% or more) a plant from acquiring a disease or condition. The phrase "prevent" can be used instead of treatment for this meaning. "Treatment," as used herein, covers one or more treatments of a disease in a plant, and includes: (a) reducing the risk of occurrence of the disease in a plant predisposed to the disease but not yet diagnosed as infected with the disease (b) impeding the development of the disease, and/or (c) relieving the disease, e.g., causing regression of the disease and/or relieving one or more disease symptoms.

The terms "bacteria" or "bacterium" include, but are not limited to, Gram positive and Gram negative bacteria. Bacteria can include, but are not limited to, *Abiotrophia, Achromobacter, Acidaminococcus, Acidovorax, Acinetobacter, Actinobacillus, Actinobaculum, Actinomadura, Actinomyces, Aerococcus, Aeromonas, Afipia, Agrobacterium, Alcaligenes, Alloiococcus, Alteromonas, Amycolata, Amycolatopsis, Anaerobospirillum, Anabaena affinis* and other cyanobacteria (including the *Anabaena, Anabaenopsis, Aphanizomenon, Camesiphon, Cylindrospermopsis, Gloeobacter Hapalosiphon, Lyngbya, Microcystis, Nodularia, Nostoc, Phormidium, Planktothrix, Pseudoanabaena, Schizothrix, Spirulina, Trichodesmium,* and *Umezakia* genera) *Anaerorhabdus, Arachnia, Arcanobacterium, Arcobacter, Arthrobacter, Atopobium, Aureobacterium, Bacteroides, Balneatrix, Bartonella, Bergeyella, Bifidobacterium, Bilophila Branhamella, Borrelia, Bordetella, Brachyspira, Brevibacillus, Brevibacterium, Brevundimonas, Brucella, Burkholderia, Buttiauxella, Butyrivibrio, Calymmatobacterium, Campylobacter, Capnocytophaga, Cardiobacterium, Catonella, Cedecea, Cellulomonas, Centipeda, Chlamydia, Chlamydophila, Chromobacterium, Chyseobacterium, Chryseomonas, Citrobacter, Clostridium, Collinsella, Comamonas, Corynebacterium, Coxiella, Cryptobacterium, Delftia, Dermabacter, Dermatophilus, Desulfomonas, Desulfovibrio, Dialister, Dichelobacter, Dolosicoccus, Dolosigranulum, Edwardsiella, Eggerthella, Ehrlichia, Eikenella, Empedobacter, Enterobacter, Enterococcus, Envinia, Erysipelothrix, Escherichia, Eubacterium, Ewingella, Exiguobacterium, Facklamia, Filifactor, Flavimonas, Flavobacterium, Francisella, Fusobacterium, Gardnerella, Gemella, Globicatella, Gordona, Haemophilus, Hafnia, Helicobacter, Helococcus, Holdemania, Ignavigranum, Johnsonella, Kingella, Klebsiella, Kocuria, Koserella, Kurthia, Kytococcus, Lactobacillus, Lactococcus, Lautropia, Leclercia, Legionella, Leminorella, Leptospira, Leptotrichia, Leuconostoc, Listeria, Listonella, Megasphaera, Methylobacterium, Microbacterium, Micrococcus, Mitsuokella, Mobiluncus, Moellerella, Moraxella, Morganella, Mycobacterium, Mycoplasma, Myroides, Neisseria, Nocardia, Nocardiopsis, Ochrobactrum, Oeskovia, Oligella, Orientia, Paenibacillus, Pantoea, Parachlamydia, Pasteurella, Pediococcus, Peptococcus, Peptostreptococcus, Photobacterium, Photorhabdus, Phytoplasma, Plesiomonas, Porphyrimonas, Prevotella, Propionibacterium, Proteus, Providencia, Pseudomonas, Pseudonocardia, Pseudoramibacter, Psychrobacter, Rahnella, Ralstonia, Rhodococcus, Rickettsia Rochalimaea Roseomonas, Rothia, Ruminococcus, Salmonella, Selenomonas, Serpulina, Serratia, Shewenella, Shigella, Simkania, Slackia, Sphingobacterium, Sphingomonas, Spirillum, Spiroplasma, Staphylococcus, Stenotrophomonas, Stomatococcus, Streptobacillus, Streptococcus, Streptomyces, Succinivibrio, Sutterella, Suttonella, Tatumella, Tissierella, Trabulsiella, Treponema, Tropheryma, Tsakamurella, Turicella, Ureaplasma, Yagococcus, i~eillonella, Vibrio, Weeksella, Wolinella, Xanthomonas, Xenorhabdus, Yersinia,* and *Yokenella.*

Other examples of bacterium include *Mycobacterium tuberculosis, M. bovis, M. ryphimurium, M. bovis* strain BCG, BCG substrains, *M. avium, M. intracellulare, M. africanum, M. kansasii, M. marinum, M. ulcerans, M. avium* subspecies paratuberculosis, *Staphylococcus aureus, Staphylococcus epidermidis, Staphylococcus equi, Streptococcus pyogenes, Streptococcus agalactiae, Listeria monocytogenes, Listeria ivanovii, Bacillus anthracis, B. subtilis, Nocardia asteroides,* and other *Nocardia* species, *Streptococcus viridans* group, *Peptococcus* species, *Peptostreptococcus* species, *Actinomyces israelii* and other *Actinomyces* species, and *Propionibacterium acnes, Clostridium tetani, Clostridium botulinum,* other *Clostridium* species, *Pseudomonas aeruginosa,* other *Pseudomonas* species, *Campylobacter* species, *Vibrio cholera, Ehrlichia* species, *Actinobacillus pleuropneumoniae, Pasteurella haemolytica, Pasteurella multocida,* other *Pasteurella* species, *Legionella pneumophila,* other *Legionella* species, *Salmonella typhi,* other *Salmonella* species, *Shigella* species *Brucella abortus,* other *Brucella* species, *Chlamydi trachomatis, Chlamydia psittaci, Coxiella burnetti, Escherichia coli, Neiserria meningitides, Neiserria gonorrhea, Haemophilus influenzae, Haemophilus ducreyi,* other Hemophilus species, *Yersinia pestis, Yersinia* enterolitica, other *Yersinia* species, *Escherichia tole,* E. hirae and other *Escherichia* species, as well as other Enterobacteria, *Brucella abortus* and other *Brucella* species, *Burkholderia cepacia, Burkholderia pseudomallei, Francisella tularensis, Bacteroides fragilis, Fudobascterium nucleatum, Provetella* species, and *Cowdria ruminantium,* or any strain or variant thereof. The Gram-positive bacteria may include, but is not limited to, Gram positive Cocci (e.g., *Streptococcus, Staphylococcus,* and *Enterococcus*). The Gram-negative bacteria may include, but is not limited to, Gram negative rods (e.g., Bacteroidaceae, Enterobacteriaceae, Vibrionaceae, Pasteurellae and Pseudomonadaceae). In an embodiment, the bacteria can include *Mycoplasma pneumoniae.*

The term "protozoan" as used herein includes, without limitations flagellates (e.g., *Giardia lamblia*), amoeboids (e.g., *Entamoeba histolitica*), and sporozoans (e.g., *Plasmodium knowlesi*) as well as ciliates (e.g., *R. tole*). Protozoan can include, but it is not limited to, *Entamoeba tole, Entamoeabe histolitica, Iodoamoeba buetschlii, Chilomastix meslini, Trichomonas vaginalis, Pentatrichomonas homini, Plasmodium vivax, Leishmania braziliensis, Trypanosoma cruzi, Trypanosoma brucei,* and *Myxoporidia.*

The term "algae" as used herein includes, without limitations microalgae and filamentous algae such as *Anacystis nidulans, Scenedesmus* sp., *Chlamydomonas* sp., *Clorella* sp., *Dunaliella* sp., *Euglena* so., *Prymnesium* sp., *Porphyridium* sp., *Synechoccus* sp., *Botryococcus braunii, Crypthecodinium cohnii, Cylindrotheca* sp., *Microcystis* sp., *Isochrysis* sp., *Monallanthus saliva, M. minutum, Nannochloris* sp., *Nannochloropsis* sp., *Neochloris oleoabundans, Nitzschia* sp., *Phaeodactylum tricornutum, Schizochytrium* sp., *Senedesmus obliquus,* and *Tetraselmis sueica* as well as algae belonging to any of *Spirogyra, Cladophora, vaucheria, Pithophora* and *Enterom orpha* genera.

The term "fungi" as used herein includes, without limitations, a plurality of organisms such as molds, mildews and rusts and include species in the *Penicillium, Aspergillus, Acremonium, Cladosporium, Fusarium, Mucor, Nerospora, Rhizopus, Tricophyton, Botryotinia, Phytophthora, Ophiostoma, Magnaporthe, Stachybotrys* and *Uredinalis* genera.

What is claimed is:

1. An agrichemical composition consisting of a chelate-based ternary complex consisting:
   hydrogen peroxide,
   a plant compatible growth promoter consisting of at least one of urea, gluconate and salicylate, and
   a divalent zinc cation and further optionally consisting of a pH modifier.

2. The agrichemical composition of claim 1 wherein the plant compatible growth promoter is urea.

3. The agrichemical composition of claim 1 wherein the plant compatible growth promoter is gluconate.

4. The agrichemical composition of claim 1 wherein the plant compatible growth promoter is salicylate.

5. The agrichemical composition of claim 1 wherein:
   the hydrogen peroxide has a concentration from about 1 micromolar (1μM) to about 1 molar (1 M) in the chelate-based ternary complex;
   the plant compatible growth promoter has a concentration from about 1 micromolar (1μM) to about 1 molar (1 M) in the chelate-based ternary complex; and
   the divalent zinc ion has a concentration from about 1 micromolar (1μM) to about 1 molar (1 M) in the chelate-based ternary complex.

6. The agrichemical composition of claim 1 wherein the composition has a pH from about 2.0 to about 6.0.

7. The agrichemical composition of claim 1 wherein the composition has a pH from about 6.5 to about 8.0.

8. The agrichemical composition of claim 1 wherein the plant compatible growth promoter is present at a concentration greater than the hydrogen peroxide.

9. A method for preparing an agrichemical composition consisting of:
   mixing together within an aqueous solution a chelate-based ternary complex, consisting of:
   hydrogen peroxide,
   a plant compatible growth promoter consisting of at least one of urea, gluconate and salicylate; and
   a divalent zinc ion and further optionally consisting of a pH modifier; and
   adjusting as needed the pH of the solution to provide a pH within a specific range.

10. The method of claim 9 wherein the pH of the aqueous solution is adjusted, as needed, to provide a pH of either:
    about 2.0 to about 6.0; or
    about 6.5 to about 8.0.

11. The agrichemical composition of claim 9 wherein the plant compatible growth promoter is urea.

12. The agrichemical composition of claim 9 wherein the plant compatible growth promoter is gluconate.

13. The agrichemical composition of claim 9 wherein the plant compatible growth promoter is salicylate.

14. A method consisting of:
    treating a surface of a structure with an agrichemical composition, consisting of a chelate-based ternary complex consisting of:
    hydrogen peroxide;
    a plant compatible growth promoter component consisting of at least one of urea, gluconate and salicylate; and
    a divalent zinc ion and further optionally consisting of a pH modifier,
    to provide for at least either;
    disabling at least a portion of a microorganism population formed upon the structure; or
    inhibiting at least in-part the growth of a microorganism population upon the structure; and
    wherein the surface is a plant or a tree.

15. The agrichemical composition of claim 14 wherein the plant compatible growth promoter is urea.

16. The agrichemical composition of claim 14 wherein the plant compatible growth promoter is gluconate.

17. The agrichemical composition of claim 14 wherein the plant compatible growth promoter is salicylate.

18. The method of claim 14 wherein the microorganism population is a bacterium.

* * * * *